Jan. 3, 1956 M. MAUL 2,729,289
KEYBOARD OPERATED MULTI-DECK RECORD PERFORATING MACHINES
Filed Nov. 12, 1952 8 Sheets-Sheet 1

Inventor:
Michael Maul
BY [signature]
ATTY.

Jan. 3, 1956  M. MAUL  2,729,289
KEYBOARD OPERATED MULTI-DECK RECORD PERFORATING MACHINES
Filed Nov. 12, 1952  8 Sheets-Sheet 3

Inventor:
Michael Maul
BY *[signature]*
ATTY.

Jan. 3, 1956 M. MAUL 2,729,289
KEYBOARD OPERATED MULTI-DECK RECORD PERFORATING MACHINES
Filed Nov. 12, 1952 8 Sheets-Sheet 5

Inventor:
Michael Maul
BY *[signature]*
ATTY.

Jan. 3, 1956    M. MAUL    2,729,289
KEYBOARD OPERATED MULTI-DECK RECORD PERFORATING MACHINES
Filed Nov. 12, 1952    8 Sheets-Sheet 6

Inventor:
Michael Maul
BY [signature]
ATTY.

Inventor:
Michael Maul

Jan. 3, 1956 — M. MAUL — 2,729,289
KEYBOARD OPERATED MULTI-DECK RECORD PERFORATING MACHINES
Filed Nov. 12, 1952 — 8 Sheets-Sheet 8
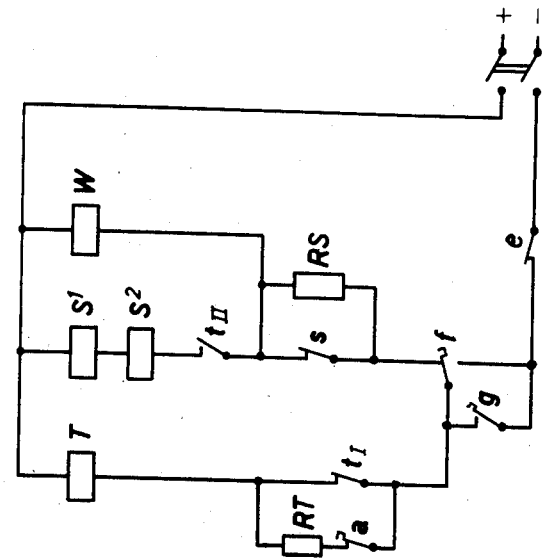
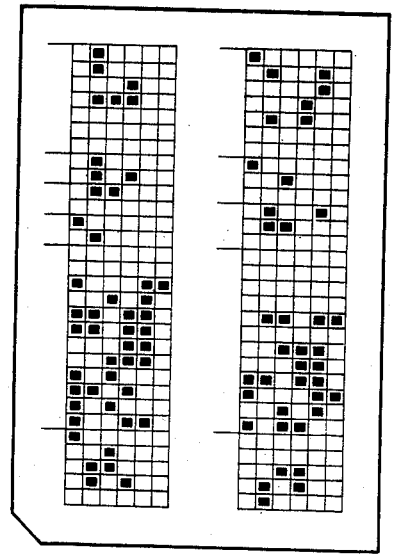
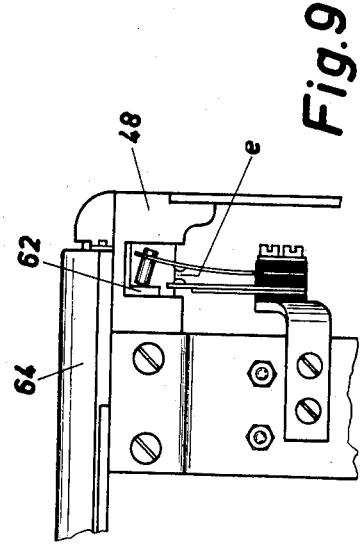
Inventor:
Michael Maul

United States Patent Office 2,729,289
Patented Jan. 3, 1956

2,729,289

KEYBOARD OPERATED MULTI-DECK RECORD PERFORATING MACHINES

Michael Maul, Schwabach, near Nurnberg, Germany

Application November 12, 1952, Serial No. 319,987

Claims priority, application Germany November 17, 1951

3 Claims. (Cl. 164—112)

It is the aim of the present invention to provide a punching machine for record cards, preferably a machine adapted for the perforation of a plurality of record decks wherein the characters are represented by hole combinations.

The machine according to the invention is characterised in that the card is almost entirely visible so that the data to be perforated can be read from the card proper. Moreover, the machine according to the invention is characterized by a compact and self-contained construction even if the machine is equipped with an alphabet key board.

In order to obtain the purpose of the invention the latter is based on a punching machine for column by column perforation of record cards wherein the card is fed past a matrix bar and is punched from the rear side, and wherein punch selection is effected by punch selectors provided between the punches and the key levers, said selectors being under the control of the key levers. Now, the essential feature of the present invention consists in that for the perforation of plurality deck cards with hole combinational characters the selector bars between key levers and punches are constructed as translator bars, that they are further provided for only one of a plurality of perforation decks and that for the purpose of deck selection they may be selectively adjusted to any one of the various sets of punches associated with the various decks.

Punching of a card from below, only a matrix bar being provided on the upper side of the card thereby obtaining visibility upon the card, is for instance known from the German Patent 266,583. In this machine, however, no operation on a plurality of decks takes place, therefore no deck selection is required and the selector bars do not serve, as in the construction according to the invention, at the same time as translator bars for hole combination control which may be set selectively to any one of the plurality of sets of punches.

Punching machines for plurality deck cards using translator bars are also known (for instance U. S. Patent 2,210,552). In the latter machines, however, punching is not effected from below, the translator bars are not constructed at the same time as selector bars for the punches and moreover they are not provided between the key levers and the punches below the card, but the punches are arranged above the card. Therefore there is only a limited visibility. Moreover the deck selection is not effected by a set of translator bars settable to one of a plurality of sets of punches whereby in the machine according to the invention a compact construction and in spite of the adjustability of the set of translator bars a small and self-contained machine is obtained.

A preferred embodiment of the invention includes a number of further advantageous features. Above all there is an arrangement which makes it possible that during the key movement, which necessarily takes place downward, the displacement of the translator bars is caused though the latter are arranged above the keys.

The same arrangement permits also an even key actuation for all keys and relieves the key levers from the displacement work for the translator bars. These advantages are obtained by effecting the displacement of the translator bars by means of a resilient power drive which is under the control of all key levers, the translator bars not to be displaced remaining locked under the control of the actuated key against the displacement power of said drive so that only the translator bars to be displaced can follow the power drive.

A further advantage of the embodiment consists in that the shifting of the translator bars necessary for deck selection is in operative connection with the return of the card carriage to its home position. Therefore upon deck change it is not necessary as in known machines (for instance U. S. Patent 2,210,552) to use two particular manipulations, namely deck shifting and carriage return, but by a single actuation both manipulations are caused simultaneously. Thus, together with the deck shifting at the same time the card will also be fed to a ready position for beginning the column by column perforation of the next deck anew.

The preferred embodiment of the invention is illustrated in the accompanying drawings:

Fig. 8 shows a card punched in the machine.

Fig. 9 shows a detail as viewed from the rear side of the machine, said detail illustrating the arrangement of a contact.

Fig. 10 shows the circuit diagram of the machine.

Punching is effected in a double deck card as shown in Fig. 8. Each deck consists of 30 columns each having six hole positions. The holes are provided in combinations. The translation of a key value takes place by translator bars arranged below the punches. For each deck there is provided an individual set of punches. Accordingly the machine includes two sets of punches each having six punches. In accordance with the six hole positions of one deck a set of six translator bars is required by which the respective key value will be transformed into the corresponding hole combination. While there is an individual set of punches provided for each deck there is a common set of translator bars for both decks in the machine which is set under the punches of the desired deck.

Deck selection

The displacement of the set of translator bars as well as releasing of the carriage return is effected by the handle 13 (Figs. 1 and 6) on the left hand side wall of the machine. Normally the handle 13 is in a middle position. If it is pulled forward the lower deck and if it is drawn rearward the upper deck will be selected. In this connection it does not matter to which deck the machine was previously set. Simultaneously with the deck selection also carriage release takes place whereby the card carriage is brought to the right (Fig. 1) to its starting position for perforation. After release of the handle the same will automatically return to its middle position the deck selection, however, remaining unaltered.

Figure 4:
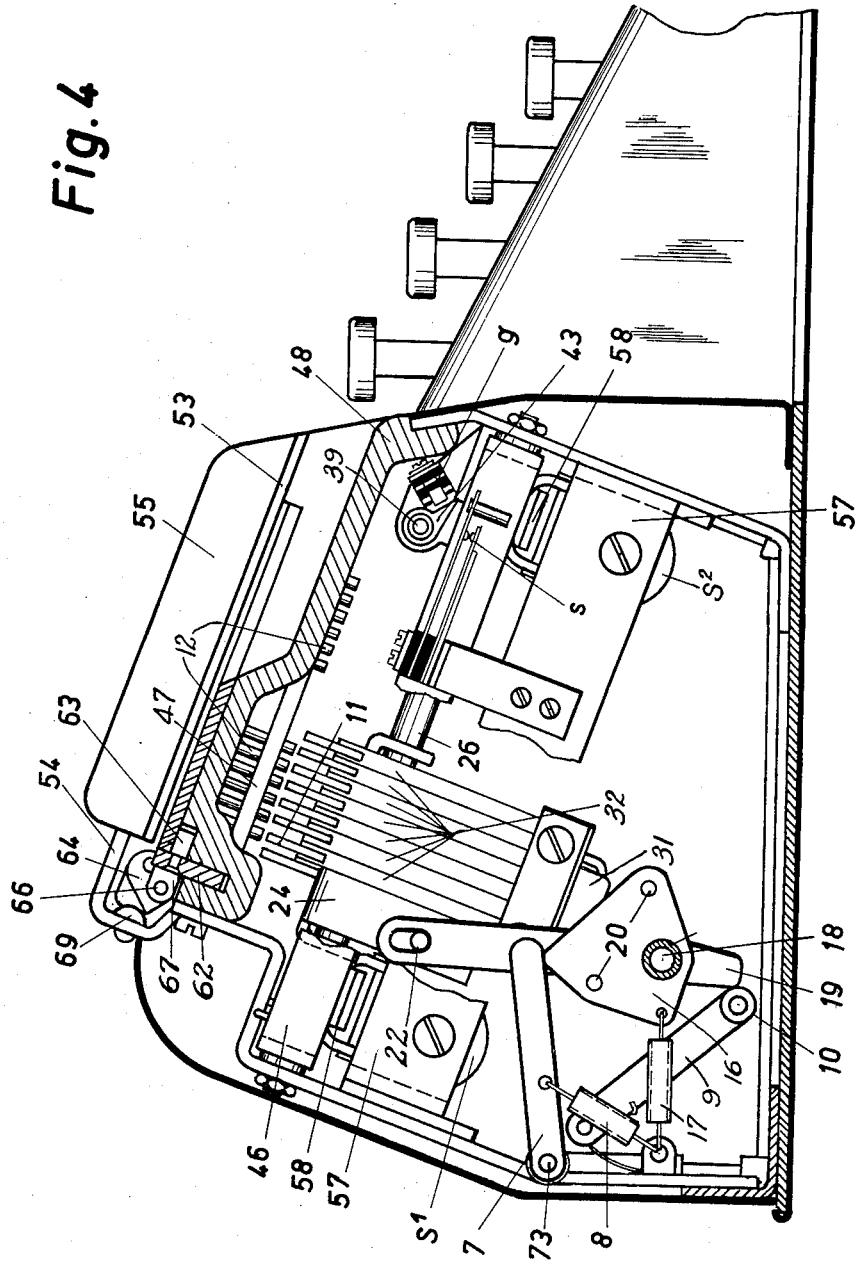
Fig. 4 shows the machine in vertical section as viewed from the left.

The handle 13 is fastened to the lever 14 (Fig. 6) rigidly mounted on the tube 15 which is mounted on the side wall of the machine. Moreover the disk 16 (Figs. 4 and 6) is provided on the tube 15 said disk being biassed towards a certain position by spring 17 said position corresponding at the same time to the middle position of the handle 13. To the plate 16 there are riveted two stops 20 through which the lever 19 seated on the shaft 18 can be engaged and moved. The shaft 18 is loosely mounted in the tube 15. The position of the stops 20 has been so chosen that the lever 19 will only be taken with them if shifting from one deck to another deck takes place, this adjustment being however unaffected by the return of the disk 16 or handle 13 to the middle position.

The lever 19 may be arrested in two positions corresponding to the two decks by means of lever 9 and roller 10 which is resiliently urged against the lever 19. In addition the lever 7 is urged by spring 8 against the disk 16. The lever 7 is fast on the shaft 73 through which carriage release is effected which will be referred to later on in detail. If the disk is rocked from its middle position the lever 7 will turn in accordance with the shape of the disk in clockwise direction thereby turning the shaft 73 and thus causing the carriage release.

Figure 5:
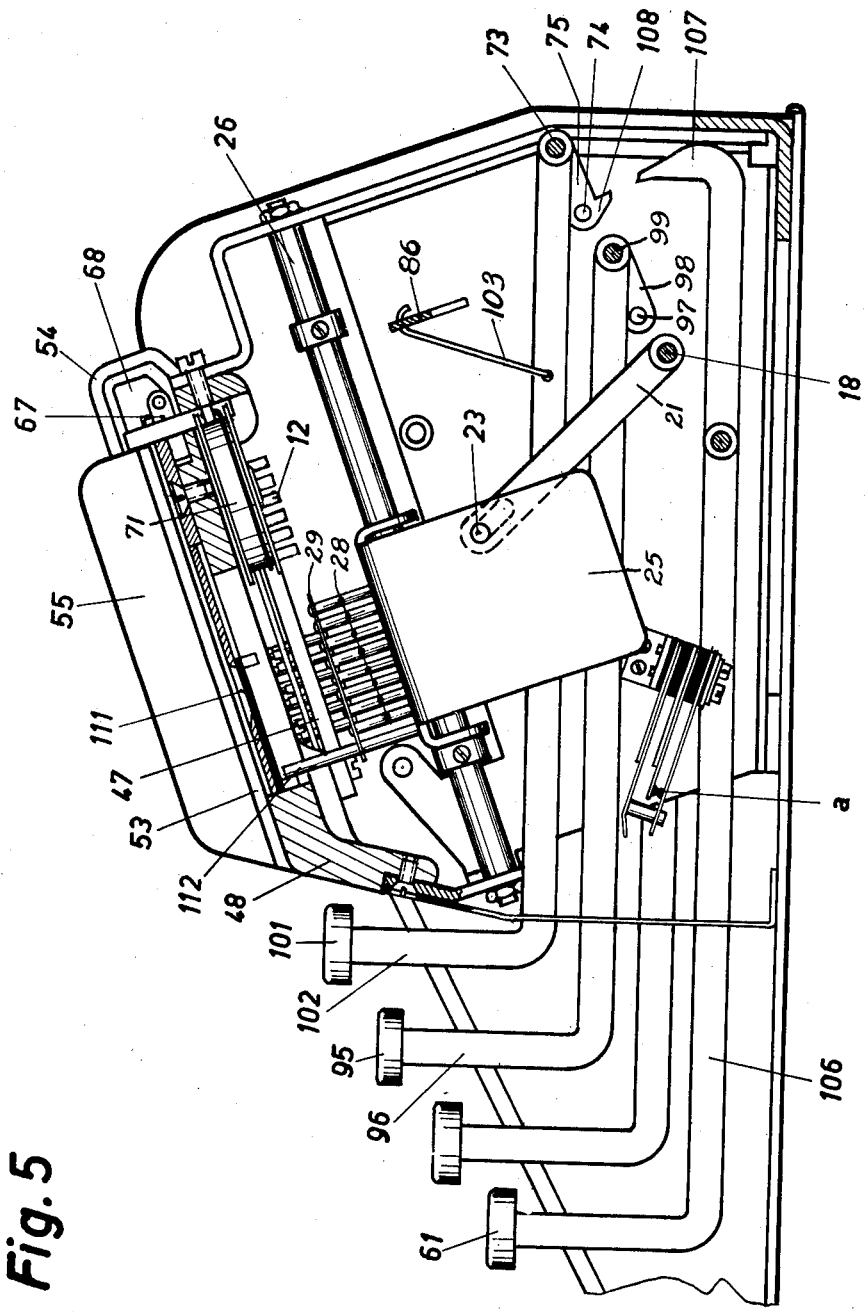
Fig. 5 shows the machine in vertical section as viewed from the right.

On shaft 18, upon which lever 19 is provided, the lever 21 is also fast (Figs. 5 and 6) which lever 21 is rocked together with the lever 19. The two shafts 18 and 73 serve at the same time for the mounting of the key levers. The pin 22 engages the lever 19 (Fig. 4) and the pin 23 the lever 21. The pin 22 is pressed into the slide 24 and the pin 23 into the slide 25. On deck shifting that is to say on movement of the levers 19 and 21, the slides are engaged and moved by said pins. The slides serve to support the translator bars and are guided on bars 26 which are fastened to braces of the machine. Pins 27 are riveted to the slides 24 and pins 28 are riveted to the slides 25, said pins serving to guide the translator bars. To the pins 28 there is also fastened a spring 29 which presses the translator bars against the slides.

On the right hand side of the machine (Fig. 1) there is provided a deck indicator 111 which indicates by the direction of the arrow to which deck the machine has been set. The displacement of the deck indication is effected by pin 112 (Fig. 5) which is riveted to the slide 25. The pin engages between two studs of the deck indicator 111 and takes the same with it on movement of the slide. The deck indicator is guided in the card bed 48 and its position is visible through a slot.

*Translation of the key values into hole combinations*

The displacement of the translator bars in the longitudinal direction is not effected directly by the character keys 30 but by the displacement magnet W (Figs. 4 and 6) through its armature 31 and blade-springs 32, one of the latter being provided for each translator bar and being resiliently connected thereto. The selector magnet W is fastened through the yoke 40 to the slide 24 and is engaged and moved on displacement of the slide and the set of translator bars.

The translator bars which are not to be displaced are locked against movement by noses which are provided on the translator bars in accordance with the different combinations. Locking is effected by the bars 33 (Figs. 2, 3 and 6) which are rocked upward by the keys. Each key 30 has a locking bar 33 associated therewith. If a key is actuated it will rock its key lever 34 downward moving with it, through actuating rod 35, the lever 36 mounted upon the shaft 37. At its left hand end (Fig. 2) lever 36 has a locking bar 33 linked to it which is rocked upward between the teeth of the translator bars.

In order to obtain an almost parallel rising of the locking bar 33 the right hand end of the same is linked to the lever 38 which is mounted upon the shaft 39. The connection and the leverage relations between 34 and 36 have been so proportioned that all locking bars make about the same displacement movement with respect to the translator bars.

On its upward movement the lever 38 will take with it the bar 41 extending over all levers 38. The bar 41 is held in two arms 42 fast upon the shaft 39 and serving to rotate the latter in counterclockwise direction on rising of the bar 41. Moreover the arm 43 (Fig. 4) is provided upon the shaft 39. It actuates the contact g, closing the current circuit through the selector magnet W. When energized the latter will displace the non-locked translator bars 11 to the left (Fig. 6) by means of the springs 32. Translator bars of which the noses are in engagement with the locking bar 33 cannot follow this movement.

Figure 2:
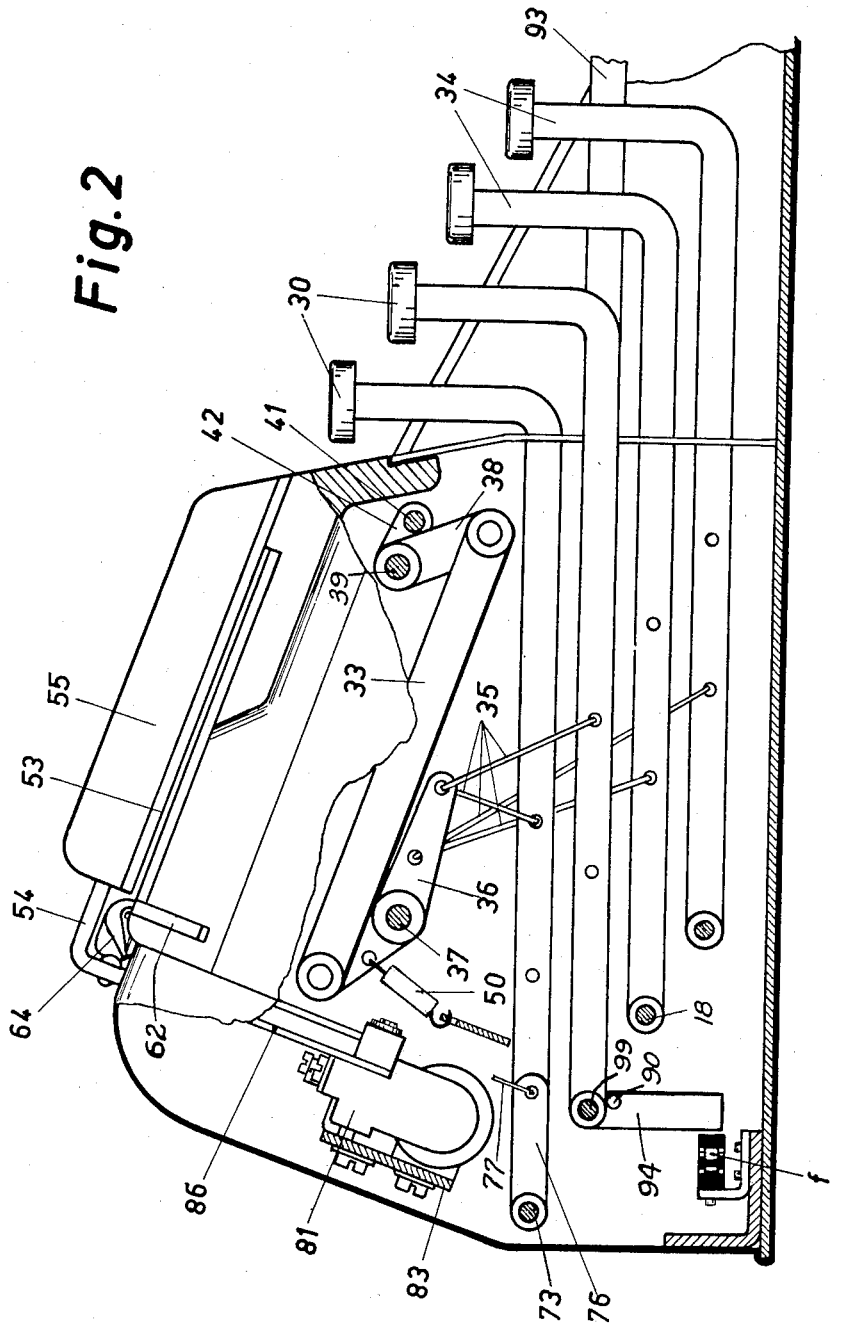
Fig. 2 shows a section across the machine from which particularly the arrangement of the key levers may be seen.
Figure 6:
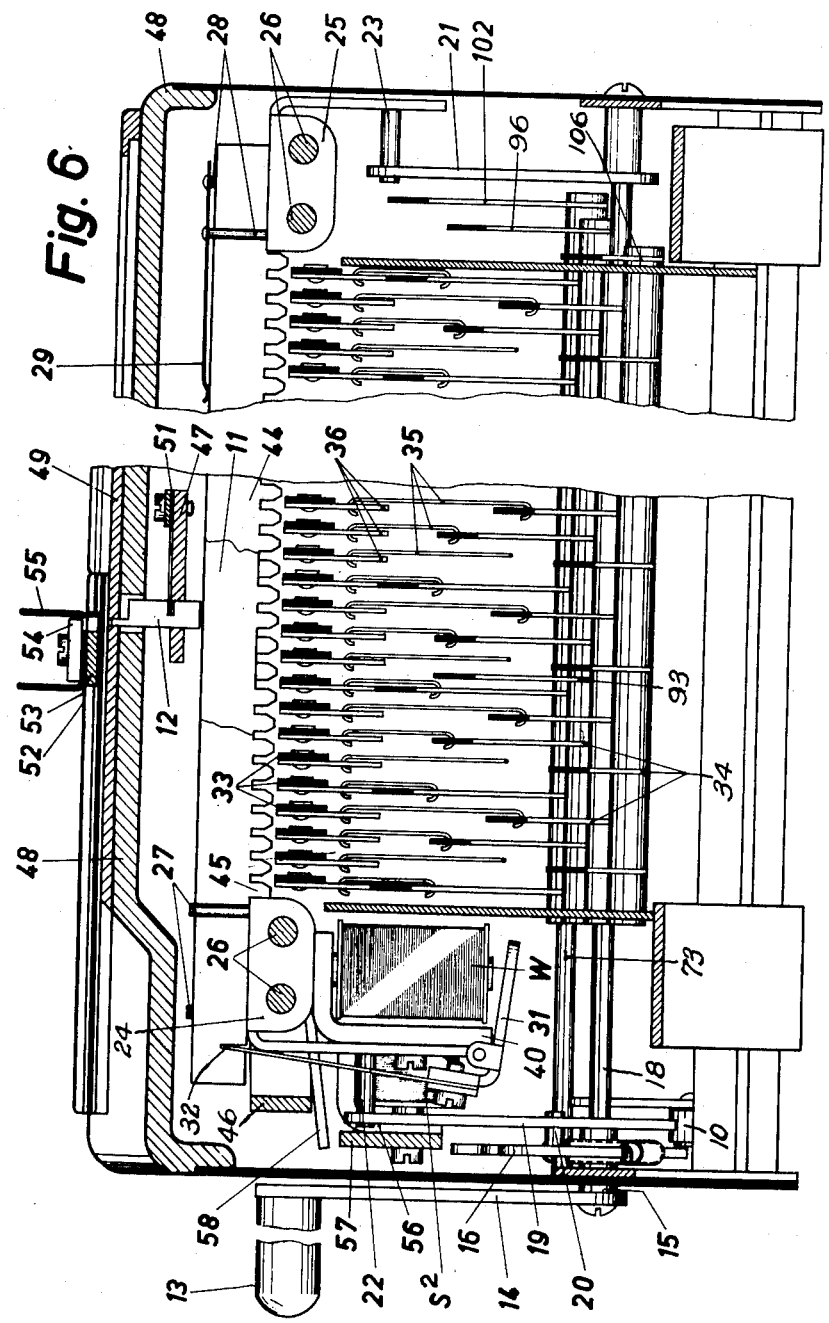
Fig. 6 shows a longitudinal section through the machine.

The locking bars 33 must be separately held since they would otherwise yield to the displacing power of the magnet W and would thereby bend. Holding is effected by the bars 44. In their external shape they are constructed exactly like the translator bars 11. The only difference consists in that on the bars 44 a nose is provided for each key. One bar 44 is provided on the right hand side (Fig. 4) of each set of translator bars. Like the translator bars they are also held on the slides 24 and 25 respectively and are engaged and moved on deck change. In addition to the normal noses the bars 44 have a nose 45 engaging the slide 24 and preventing movement to the left (Fig. 6). After release of the key 30 the key as well as the locking bar 33 and the intermediate members are restored by means of spring 50 (Fig. 2).

*Punching*

During their movement to the left (Fig. 6) the unlocked translator bars will pass with their left hand end over the punching yoke 46 which is mounted on the guide rod 26. It may be rocked upward by two punching magnets S, which become effective, in a manner still to be described, after energization of the selector magnet W and the feed magnet T. Thereupon the yoke 46 will take the displaced translator bars upwardly with it which in turn will take with them the punches 12 and will press the same through the card.

Figure 3:
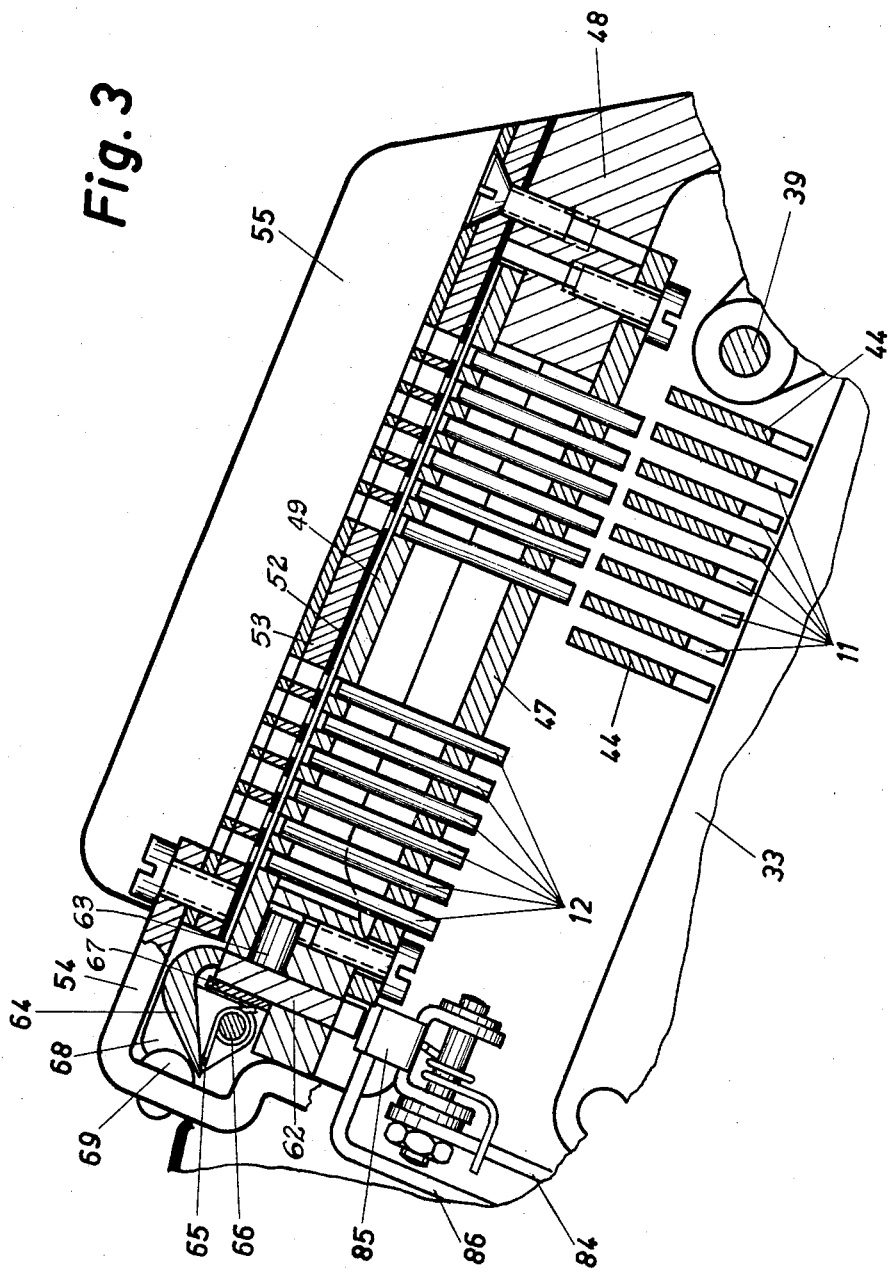
Fig. 3 shows the arrangement of the punches and of the translator bars in section.

The punches 12 are guided in the bar 47 fastened to the card bed 48 and in the plate 49. The punches are held in their home position by the blade springs 51. The matrix 52 is above the card and is fastened to the matrix carrier 53. At its front end the latter is fastened immediately to the bed 48 while at its rear end it is fastened thereto through the stirrup 54 (Fig. 3). Above the matrix 53 there is a groove 55 which prevents the punching waste from falling on to the card and removes said waste to the front side.

Both punching magnets S are fastened to the cross stirrup 57 through their yokes 56. The actuation of the punching yoke 46 is caused by the armatures 58 which are mounted on the magnet yokes 56 of both the magnets S. The armature of the one punching magnet will also actuate the contact s (Fig. 4) the function of which will be referred to later on in connection with the description of the circuit diagram.

After completion of the punching operation and after the return of the key lever to its home position the selector magnet W will also be deenergized so that its armature will drop and will be restored to the home position by the blade springs of the undisplaced translator bars and the holding bar 44 respectively. The displaced selector bars will then be moved by their blade springs.

*Card feed*

Figure 1:
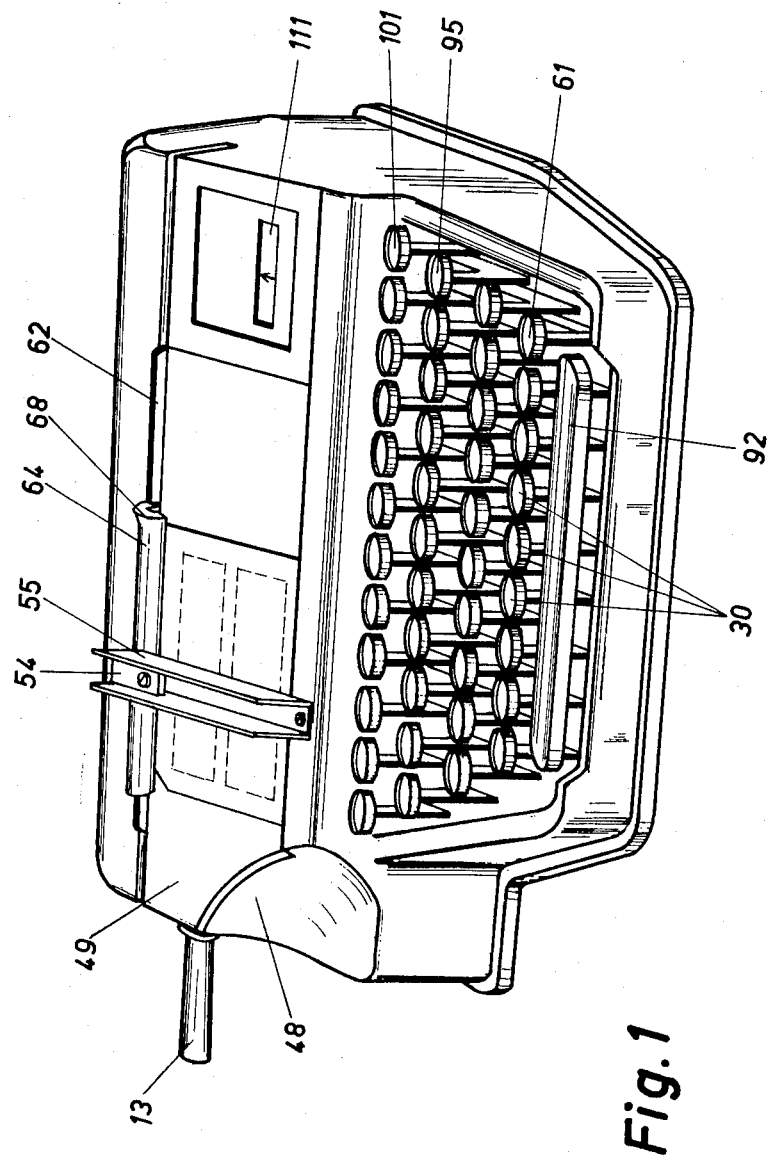
Figure 1 shows a perspective general view of the machine.

Insertion of the card takes place at the left hand side of the machine (Fig. 1). After the card has been inserted, the deck to be punched is selected by means of handle 13 and simultaneously therewith the card carriage 62 is released. Under spring tension the carriage will then run to the right hand or starting position for punching and will take the card with it. On actuation of a character key 30 the carriage will be shifted for one step to the left. When punching of one deck of the card is completed the card has again reached the left hand position. If now entries are also to be punched in the other deck, said other deck is selected by the handle 13 and the carriage is again moved to its right hand position. When punching of the card is finished it has reached the left hand position and may be removed from the machine.

The card carriage 62 (Fig. 3) is guided in the bed 48. Falling out is prevented by the pins 63. On the card carriage 62 there is provided a card gripper bar 64 which holds the card to the carriage under the pressure of the spring 65 during the punching operation. The gripper 64 is mounted on the shaft 66 which is held in the bracket 67 fastened to the card carriage 62. At the right hand end of the gripper 64 (Fig. 1) there is provided a projection 68. When the carriage reaches the left hand end position the projection of the gripper will pass under the stop 69 which will rock the gripper in counter-clockwise direction (Fig. 3) thus releasing the card.

Figure 7:
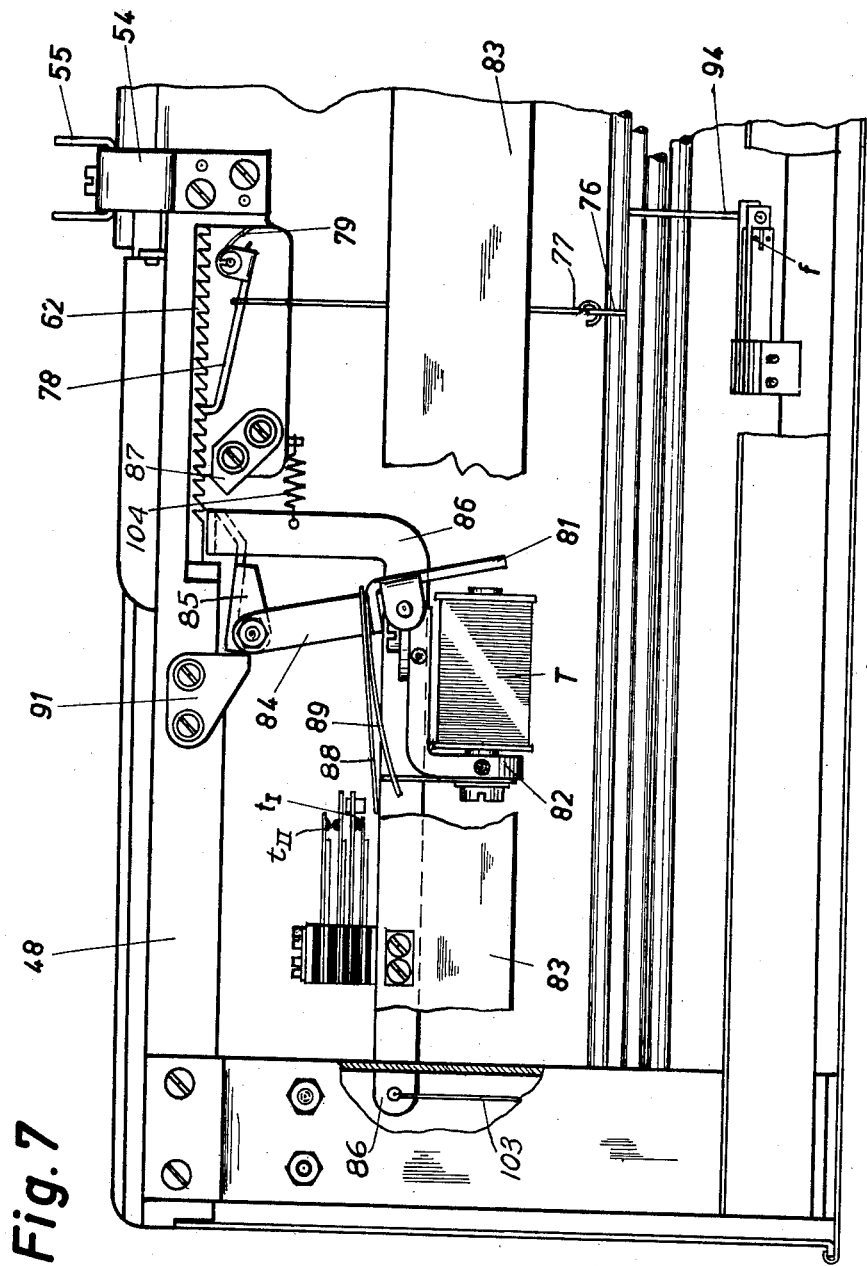
Fig. 7 shows a rear view of the machine with the cover removed from which particularly the feed for the card carriage may be seen.

Carriage release is effected by the handle 13 as has already been described above. If the latter is rocked forward or backward the lever 7 (Fig. 4) will be drawn downward in both cases and the shaft 73 (Fig. 2) will be turned in the clockwise direction. Fast on the latter is the lever 76 (Fig. 2) from which an actuating bar 77 extends to the rocking pawl 78 (Fig. 7). Therefore on rocking of the handle 13 the pawl will be removed from the teeth of the card carriage 62 thus releasing the latter so that a spiral spring provided in the spring casing 71 (Fig. 5) can move the carriage through a cord to the left (Fig. 7). If the lever 14 is again released, the locking pawl 78 and therewith all intermediate members up to lever 7 are restored to the home position by means of spring 79.

On actuating a character key the contact g is closed as has already been described. Thereby in addition to the current circuit through the selector magnet W the current circuit through the feed magnet T (Fig. 7) is closed which will be energized and will attract its armature 81. The latter is mounted on the magnet yoke 82 by means of which the magnet T is fastened to the cross bar 83. On the arms 84 of the armature 81 is mounted the pusher pawl 85 which is resiliently urged against the teeth of the carriage 62. In the rest position the pawl 85 is held disengaged from the teeth by means of the lever 86. On its movement to the right (Fig. 7) the pawl 85 will slide from the lever 86 and will pass into the teeth of the card carriage thus taking the latter with it up to the stop 87. The locking pawl 78 will then engage the next tooth whereby the carriage will be fed one step to the right.

At the same time the spring 88 which is fastened to the armature 81 will actuate the contacts $t_I$ and $t_{II}$ of which the function will be referred to later in connection with the description of the circuit diagram. If the current through the magnet T is interrupted the armature 81 will drop and by means of spring 89 will be restored together with pusher pawl 85 to the home position which is determined by stop 91.

If the skip key 92 is actuated it will rock the key lever 93 (Fig. 2) which in turn, by means of a pin 90 will take with it the arm 94, said arm actuating the contact $f$. The latter closes the current circuit through the magnet T and interrupts the latter through the magnets W and S. The current circuits will be referred to later on in connection with the description of the circuit diagram. By energization of the magnet T shifting for one step will be effected as has already been described.

On depression of the release key 95 (Fig. 5) the key lever 96 which is mounted on the shaft 99 will be rocked. The key lever 96 will thereby open the contact $a$ and by means of pin 97 will take with it the lever 98 on the shaft 99. The shaft 99 serves also for the mounting of the character key levers. Moreover the arm 94 (Fig. 2) which actuates the contact $f$ is fast on the shaft 99. The arm 94 may also be rocked by the skip key as has already been described. By means of the contacts $a$ and $f$ an automatic interrupting current circuit will be established through the feed magnet T, the latter being continuously energized and deenergized whereby the carriage is fed to the left (Fig. 1) step by step. The details of the current circuit will be referred to later on.

If the carriage is in the insertion position the actuation of any character key must not cause any response of magnets. This is obtained by the contact $e$ (Fig. 9) which is opened by means of the card carriage 62 in the insertion position thus interrupting the entire current circuit of the machine.

The back space key 101 (Fig. 5) operates purely mechanically. When it is actuated it rocks the key lever 102 which is freely mounted on the shaft 73. The lever will then take with it, by means of pin 74, the lever 75 which is fast on the shaft 73. Thereby the shaft 73 will be rocked and through the lever 76 and the bar 77 the locking pawl 78 will be withdrawn from the rack of the card carriage as has already been described. At the same time the lever 86 will be drawn downwards by bar 103. The lever 86 (Fig. 7) is, like the armature 81, mounted on the yoke 82 of the feed magnet and rocks in counter-clockwise direction. Thereby the pusher pawl 85 loses its fulcrum, will drop into the rack of the card carriage and will cause locking. The position of the two pawls 78 and 85 has been so chosen, that under the influence of spring 71 the carriage will slide for half a step to the left on the change-over from one pawl to the other (Fig. 7). If the back space key is released again the lever 86 will be fed to home position by spring 104 and therewith also the key lever 102. The pawl 85 is removed from the rack while the locking pawl 78 again assumes locking. During this change of teeth there will again occur half a step to the left so that during this action the carriage has moved backward for a whole skip, that is to say, to the right in Fig. 1.

If the machine is to be set to another deck without thereby causing release of the carriage return, key 61 must be depressed simultaneously with the deck shifting by lever 13. Thereby the lever 106 is rocked in counter-clockwise direction (Fig. 5) whereby the nose 107 of lever 106 will pass behind the nose 108 of lever 75 and will thereby lock the rotation of the lever 75 in counter-clockwise direction. As has already been mentioned above the lever 75 is seated fast upon the shaft 73 together with the lever 76 for the pawl release so that thereby said release is prevented.

*Circuit diagram*

In the illustration of the circuit diagram (Fig. 10) for the punching machine a simplified conventional form has been chosen, as generally used in the art of communication. The relays and magnets are designated by capital letters and the contacts which they actuate by the corresponding small letters. Manually actuated contacts are characterized by a hook on the upper end of the movable contact member. Generally, the designations for the magnets, relays and contacts are so arranged that the characters are to the right or above the wiring symbol respectively.

If the machine is switched on and if a character key is actuated the contact g is closed. Current will now flow from negative through the contacts $e$, $g$, $f$, $s$, through the selector magnet W to positive. At the same time current will also flow from contact $g$ through the contact $t_1$, the feed magnet T to positive. The selector magnet W and the feed magnet T will respond. The feed magnet T will now open its contact $t_1$ and will close the contact $t_{11}$.

Now current will no longer flow through contact $t_1$ to the feed magnet T but through contact $a$ and the resistance RT. The latter has been provided in order to prevent the high initial current from flowing through the feed magnet as long as the key is depressed, thus avoiding over-heating on too long a depression of the key.

Through closure of the contact $t_{11}$ the current circuit through the punching magnets $S^1$, $S^2$ will be established so that the same will respond and will open the contact $s$. The current will now no longer flow through the contact $s$ but through the resistance RS which will throttle the initial current of the punching magnet as well as of the selector magnet to an extent such as to maintain a holding circuit in order to avoid over-heating. The contact $t_{11}$ has been provided in order that the punching magnets may only respond if the feed magnet and the selector magnet have already responded. This is necessary since punching must not occur before the displacement of the translator bars by the selector magnet, and also the card feed have been completed. The contacts $t_1$ and $t_{11}$ are so adjusted that they will be actuated only in the last moment of the armature movement of magnet T.

If the skip key is actuated the contact $f$ is shifted whereby the feed magnet T will receive current through the contact $t_1$ and will respond. The current circuit to the selector or punching magnet respectively has however been interrupted in this case through the contact $f$ so that the magnets cannot respond.

On actuation of the release key 95 the contact $a$ will be opened and the contact $f$ will be shifted as has already been described above. By this means the card feed magnet will receive current through the contact $f$ and $t_1$ and will respond. By the response of the magnet T the contact $t_1$ is opened and the current through the magnet T is interrupted since the contact $a$ is held open by the key. Accordingly the feed magnet T will become deenergized and contact $t_1$ will close again so that the magnet T will receive current and will be energized. These operations will be repeated until either the release key has been released or until the card carriage has reached the insertion position. In this position it opens the contact $e$ which interrupts the current circuit for the whole machine and therewith also the automatic interrupting operations of magnet T.

I claim:
1. In a punching machine for multi-deck hole combinational record cards in which each deck comprises a row of adjacent record columns, a punching mechanism and means for feeding the card column by column past said punching mechanism with the die of said punching mechanism disposed above the visible side of the card and the punches below the card, said punching mechanism including for each record deck a separate set of punches for the perforation of a single record column, the various sets of punches being arranged in a row transversely of the feeding direction of the card, a set of controlling bars under the punches for a single set of punches, a carrier for said controlling bars and a bearing guide for said carrier, said carrier being movable as a unit together with the controlling bars on said bearing guide in the direction of said row of punches, manually operable deck selection means for positioning said carrier and therewith the controlling bars in operative position with respect to any one of said sets of punches, a set of key levers common to all said sets of punches and co-operating with said single set of controlling bars in each deck selection position of the carrier, said controlling bars serving at the same time as punch selector bars as well as translator bars for translating the actuation of the key lever into a combinational control of said punches, and power driven punch actuating means effective upon actuation of any of said key levers for actuating said punches by means of said controlling bars.

2. A machine as specified in claim 1, characterised by a deck selection lever operatively connected to said carrier which lever may be moved from a datum position to a deck selection position thereby positioning the set of controlling bars to the set of punches corresponding to the selected deck and returning after deck selection automatically to the datum position, while the set of controlling bars remains in the selected deck position.

3. A machine as specified in claim 1, wherein the power drive consists of a punch magnet mounted on the carrier for the controlling bars and movable together with the carrier upon deck selection.

References Cited in the file of this patent
UNITED STATES PATENTS

| | | |
|---|---|---|
| 1,962,607 | Maul | June 12, 1934 |
| 2,397,605 | Holden | Apr. 2, 1946 |